J. Myers,
Flour Sieve.

Nº 50,025.  Patented Sep. 19, 1865.

Witnesses:

Inventor:
Jas. Myers

United States Patent Office.

JAMES MYERS, JR., OF NEW YORK, N. Y.

FLOUR-SIFTER.

Specification forming part of Letters Patent No. 50,025, dated September 19, 1865.

*To all whom it may concern:*

Be it known that I, JAMES MYERS, Jr., of the city, county, and State of New York, have invented a new and Improved Device for Sifting Flour and other Substances; and I do hereby declare that the following is a full, clear, and exact description thereof, which will enable others skilled in the art to make and use the same, reference being had to the accompanying drawings, forming part of this specification, in which—

Figure 1:
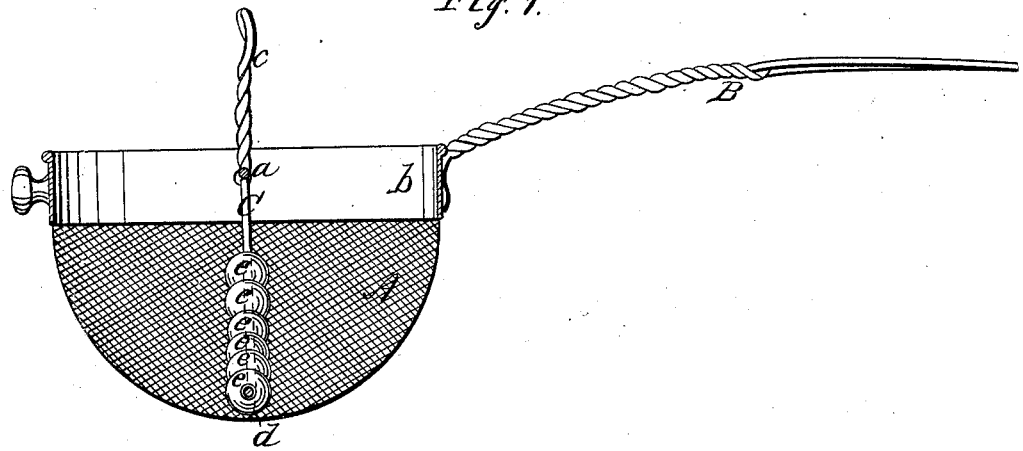
Figure 2:
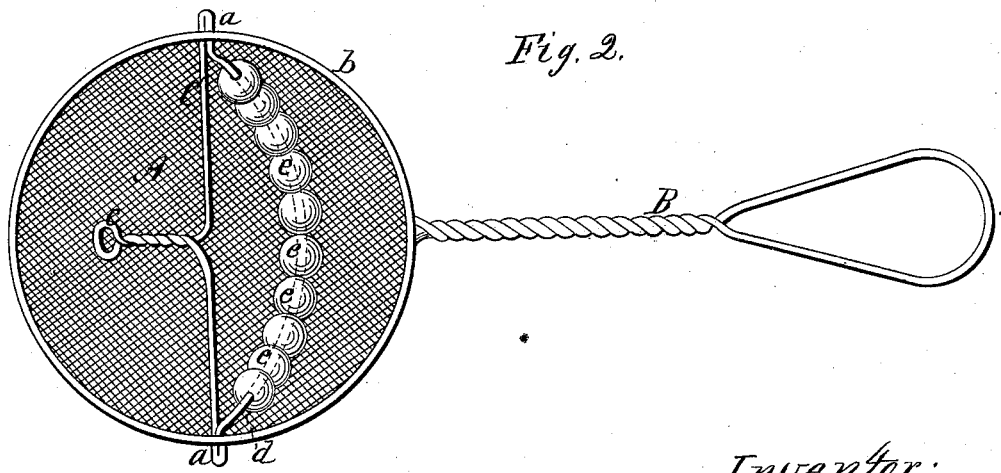

Figure 1 is a side sectional view of my invention; Fig. 2, a plan or top view of the same.

Similar letters of reference indicate corresponding parts.

This invention relates to a new and improved device for sifting flour and other substances for domestic use.

The invention consists in the employment or use of a semi-spherical sieve in connection with an oscillating frame provided with spheres or balls, all being arranged as hereinafter fully set forth.

A represents a sieve of semi-spherical form, constructed of wire-cloth, and having a suitable handle, B, attached to it. This sieve may be of any suitable or desired dimensions, and it has within it an oscillating frame, C, suspended on journals $a\ a$, which are fitted in the rim $b$ of the sieve, said frame being provided with a handle, $c$, for the purpose of operating it. The frame C is so constructed as to have a curved rod, $d$, at its lower end, the curve of said rod corresponding to the curvature of the sieve; and the journals $a\ a$ of the frame C are at points which coincide with the axis of a sphere of which the sieve A forms a part.

On the rod $d$ of the frame C there are placed a series of spheres, $e$, which may be constructed of glass or any suitable material. These spheres are fitted loosely on the rod $d$, so that they may rotate freely thereon and also move laterally, and they bear upon the inner surface of the sieve, operating as the frame C is oscillated or vibrated to press the substance or material in the sieve through the same, the sphere at the same time yielding or moving laterally on the rod $d$ in case they meet with any obstruction, such as a small stick, &c. This feature is an important one, and distinguishes my invention over all others of the kind, for none, so far as I am aware, have any laterally-yielding rollers or spheres. Rollers passing along the whole width of a screen have been used, but these cannot give or yield to obstructions, but press upon and frequently pulverize them, so that fine foreign particles will pass through the sieve with the material or substance to be sieved.

This difficulty is fully obviated by my invention, room being allowed on the rod $d$ for the spheres $e$ to move laterally.

Having thus described my invention, I claim as new and desire to secure by Letters Patent—

A sieve for family use constructed in the form of a semi-sphere, and provided with an oscillating frame, the lower part of which has a curved rod corresponding with the curvature of the sieve, and having upon it a series of spheres or balls, all arranged substantially as shown and described.

JAMES MYERS, JR.

Witnesses:
M. M. LIVINGSTON,
C. L. TOPLIFF.